(12) United States Patent
Tiirola et al.

(10) Patent No.: US 7,827,475 B2
(45) Date of Patent: Nov. 2, 2010

(54) ENHANCED RANDOM ACCESS TRANSMISSION

(75) Inventors: Esa Tiirola, Oulu (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 815 days.

(21) Appl. No.: 11/229,582

(22) Filed: Sep. 20, 2005

(65) Prior Publication Data

US 2006/0248437 A1    Nov. 2, 2006

(30) Foreign Application Priority Data

May 2, 2005    (EP)    ................................. 05009627

(51) Int. Cl.
*H04L 1/08* (2006.01)
(52) U.S. Cl. .................... 714/822; 714/784; 714/779
(58) Field of Classification Search ................ 714/822, 714/784, 746, 758, 779, 776, 752, 46; 455/226.4
See application file for complete search history.

(56) References Cited

U.S. PATENT DOCUMENTS

| | | | | |
|---|---|---|---|---|
| 3,618,017 A | * | 11/1971 | Murayama et al. | 714/748 |
| 4,670,906 A | * | 6/1987 | Thro | 455/525 |
| 5,027,353 A | * | 6/1991 | Jarwala et al. | 714/738 |
| 5,210,751 A | * | 5/1993 | Onoe et al. | 370/349 |
| 5,388,252 A | * | 2/1995 | Dreste et al. | 714/46 |
| 6,243,568 B1 | * | 6/2001 | Detlef et al. | 455/226.4 |
| 6,498,936 B1 | * | 12/2002 | Raith | 455/466 |
| 6,639,935 B2 | * | 10/2003 | Gibbons et al. | 375/130 |
| 6,909,758 B2 | * | 6/2005 | Ramesh et al. | 375/340 |
| 2002/0015419 A1 | | 2/2002 | Kim et al. | |

FOREIGN PATENT DOCUMENTS

| | | |
|---|---|---|
| EP | 0938207 | 8/1999 |
| WO | WO 2003/101029 | 12/2004 |

OTHER PUBLICATIONS

3GPP TS 25.211 V6.5.0 (Jun. 2005), Technical Specification, 3$^{rd}$ Generation Partnership Project; Technical Specification Group Radio Access Network; Physical Channels and Mapping of Transport Channels Onto Physical Channels (FDD) (Release 6), 2005, pp. 1-49.
"Radio Network Planning and Optimization for UMTS", Laiho et al, 2002, pp. 38-40.
"Radio Network Planning," WCDMA for UMTS, Holma et al, 2002, pp. 169-211.
Subiela, D. Engels et al.; Proceedings of the 28th European Solid-State Circuits Conference, 2002, ESSCIRC 2002; Sep. 24-26, 2002; pp. 259-262; http://www.design-reuse.com/articles/?id=8085 &print=yes.

* cited by examiner

*Primary Examiner*—Fritz Alphonse
(74) *Attorney, Agent, or Firm*—Squire, Sanders & Dempsey L.L.P.

(57) ABSTRACT

In a transmitting entity a message of a first time period L is divided into N self-decodable blocks and transmitted towards a communications network. At the communications network the N self-decodable blocks are detected by a receiving entity and decoded on a block basis.

34 Claims, 8 Drawing Sheets

ENHANCED RANDOM ACCESS TRANSMISSION

FIELD OF THE INVENTION

The present invention relates to transmitting a message from a transmitting entity to a receiving entity. In particular, the invention relates to random access transmission in wireless communications systems including a cellular communications system.

BACKGROUND OF THE INVENTION

A random access transmission is used e.g. to set up a connection between a user equipment UE and a node providing a physical link between the user equipment and a communications network. In UMTS (Universal Mobile Telecommunications System) this node is called Node B. Analogies can be drawn between the function of a Node B and those of a Base Transceiver Station.

Figure 1:
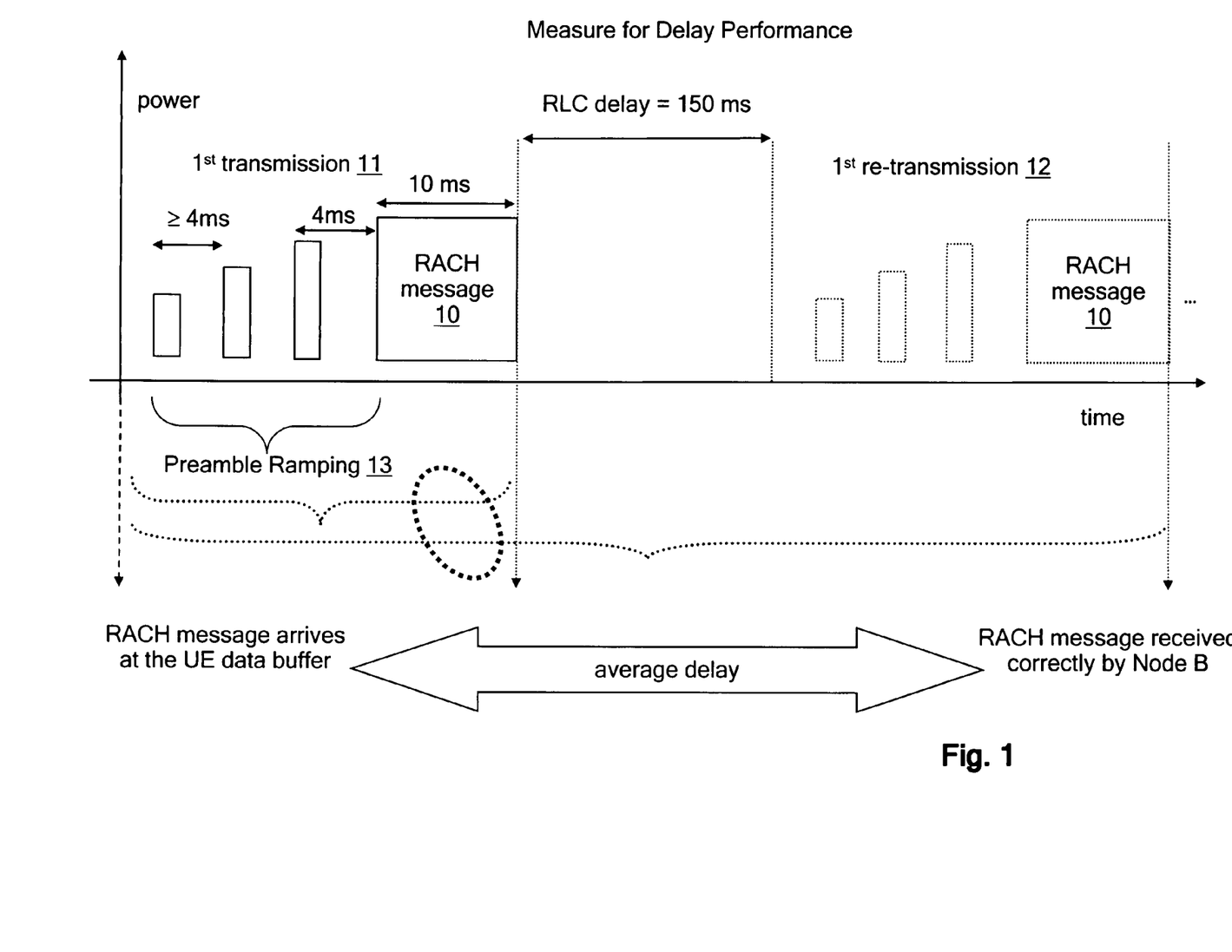
FIG. 1 shows a schematic diagram illustrating delay performance of a RACH channel.

In general, an RACH (Random Access CHannel) carries uplink control information such as a request to set up an RRC (Radio Resource Control) connection. It is further used to send small amount of uplink packet data. Because of the relative large delay related to RLC (Radio Link Control)-level re-transmission, the BLER (BLock Error Rate) operation point of the RACH transmission must be kept at relative low level (<5%), otherwise the delays in connection setup will be rather high. FIG. 1 shows an RLC delay of 150 ms between a first transmission 11 of an RACH message 10 and a first re-transmission 12 of the same. Thus, a considerable delay between the time when the RACH message 10 arrives at a data buffer of the UE and a time when the RACH message 10 is correctly received by the Node B is caused when the RACH message has to be re-transmitted.

For avoiding re-transmission, rather high Eb/No (Energy per bit-to-Noise density ratio) requirement for the RACH reception is required. RACH performance issues are further emphasized by the fact that soft handoff and power control are not supported by the RACH.

Figure 2:
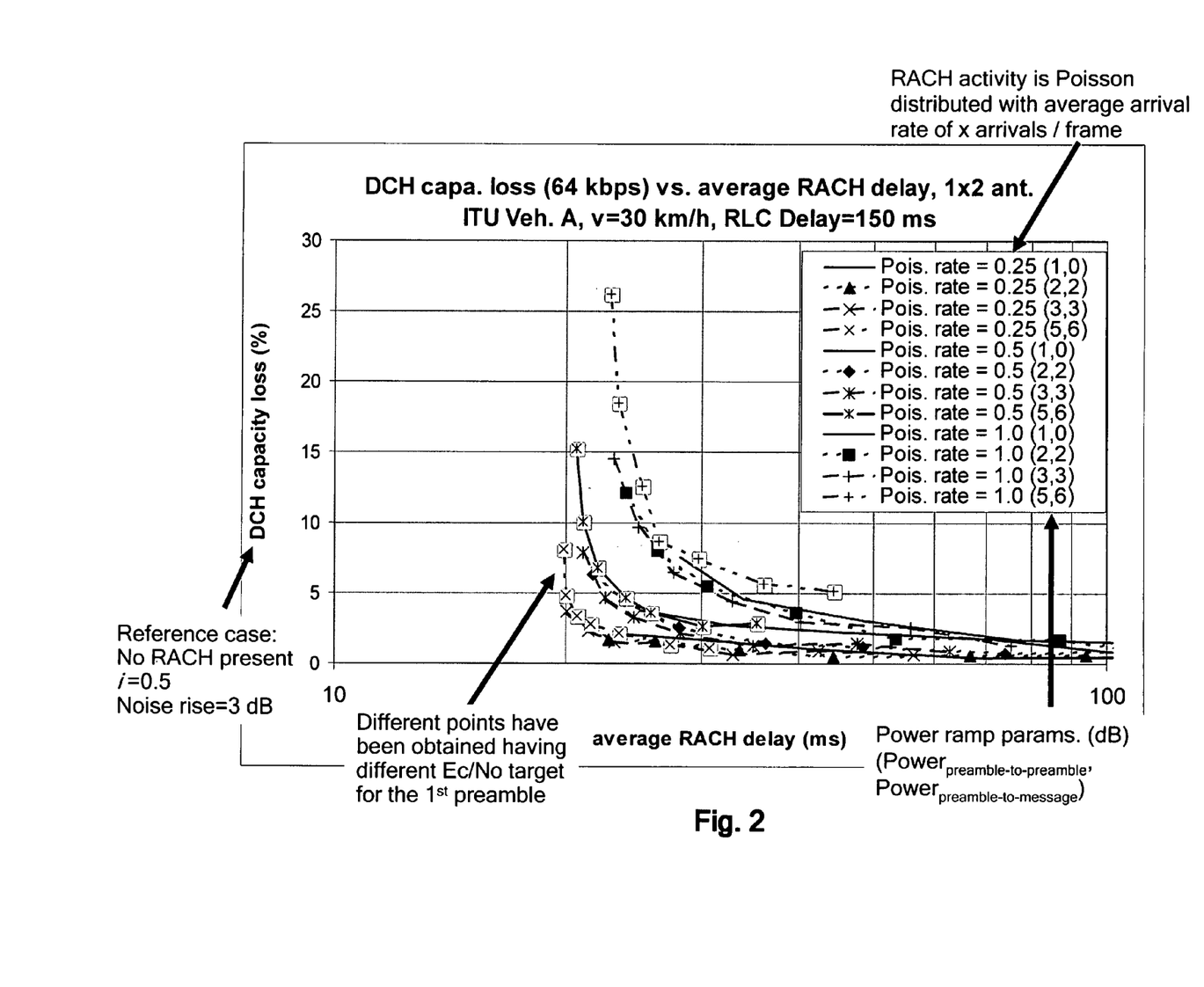
FIG. 2 shows graphs illustrating a DCH capacity loss versus an average RACH delay.

Currently supported transport formats for RACH include TTI (Transmission Time Interval) lengths of 10 ms and 20 ms. Link level simulations were conducted to study the delay performance of RACH using 10 ms TTI with a data rate on RACH of 16 kbps. FIG. 2 illustrates the simulated function of average RACH delay and DCH (Dedicated CHannel) capacity loss in terms of 64 kbps users. The reference case corresponds the situation where no RACH load is present, giving a cell throughput value of 790 kbps for dedicated channels. Further simulation parameters and assumptions are 10% BLER, Noise rise=3 dB, ratio of other-to-own cell interference i=0.5, ITU Vehicular A channel, v=30 km/h, 2 Rx antennas, RLC delay=150 ms and average RACH arrival rate=1/2 times per frame.

As can be seen from FIG. 2, the higher the delay requirement for RACH, the higher is the capacity degradation experienced by dedicated channels. In other words, the L1 or physical layer delay of RACH can be improved at the expense of DCH capacity. FIG. 2 shows also the fact that the cell capacity is degraded when the RACH activity (Poisson rate) is increased (and vice versa). In other words, the data rate (16 kbps) used in RACH also has an impact on the DCH capacity.

FIG. 2 shows that the average RACH delay using the current transport format is always more than 20 ms. As illustrated in FIG. 1, delay components included in the average RACH delay are preamble ramping process 13, transmission/reception of the message part (>10 ms) and additional delay due to the RLC-level re-transmissions (150 ms each). It is to be noted that the numerical values of the delay components presented in FIG. 1 are examples. Actual values may depend on implementation.

A prior art technique to reduce the RACH delay is to use the shorter TTI. However, use of shorter TTI length means decreased coverage area for RACH and at the same time degraded radio performance because of the smaller interleaving gain. RACH coverage is essential for proper system operation because RACH must be heard from the whole desired cell coverage area.

Another prior art technique to reduce the RACH delay is to use L1 HARQ (Hybrid Automatic Repeat Request). This approach is more complex from the UE point of view since it requires data buffering and fast L1 feedback signaling between Node B and the UE.

SUMMARY OF THE INVENTION

In view of the above, the physical layer delay of a random access transmission should be reduced, maintaining at the same time good performance properties in terms of capacity and coverage.

According to the present invention, this is achieved by a transmitting entity according to claim 1 and a transmitting method according to claim 13. This is also achieved by a receiving entity according to claim 7 and a receiving method according to claim 18. The invention may also be implemented as computer program product.

Further features of the invention are defined in the dependent claims.

According to the invention, in a transmitting entity a message of a first time period L is divided into N self-decodable blocks and transmitted towards a communications network. At the communications network the N self-decodable blocks are detected by a receiving entity and decoded on a block basis. Here a 'message' may comprise control information and/or user data communicated between a transmitting entity and a receiving entity.

The invention presents a new transport format to be used in random access transmission. A message part to be transmitted on a RACH channel is divided into N self-decodable blocks to allow faster decoding attempts and thereby reduce the RACH delays.

In particular, the invention is proposed for 3G (third generation) systems and their evolution. The assumptions due to a "beyond 3G system" are: low access delay target, high peak channel data rate and high ratio of IP packet data.

According to the invention, the L1 delay of RACH transmission is reduced while maintaining good performance properties in terms of uplink capacity and coverage. L1 delay will be even more important in the future as some of the RNC (Radio Network Controller) functions are transferred from RNC to Node B.

The transport format of the invention allows better delay performance for RACH (characteristic of short TTI), does not limit the RACH coverage area (characteristic of long TTI), and provides interleaving gain (characteristic of long TTI).

DESCRIPTION OF THE INVENTION

In the following the present invention will be described by way of preferred embodiments thereof taking into account the accompanying drawings. First of all, an overall concept of the invention will be described by referring in particular to FIGS. 3 and 4.

The idea of the invention is to divide a message, e.g. a message required for connection setup with a communications network or a message part of a random access transmission, into N self-decodable blocks.

Figure 3:
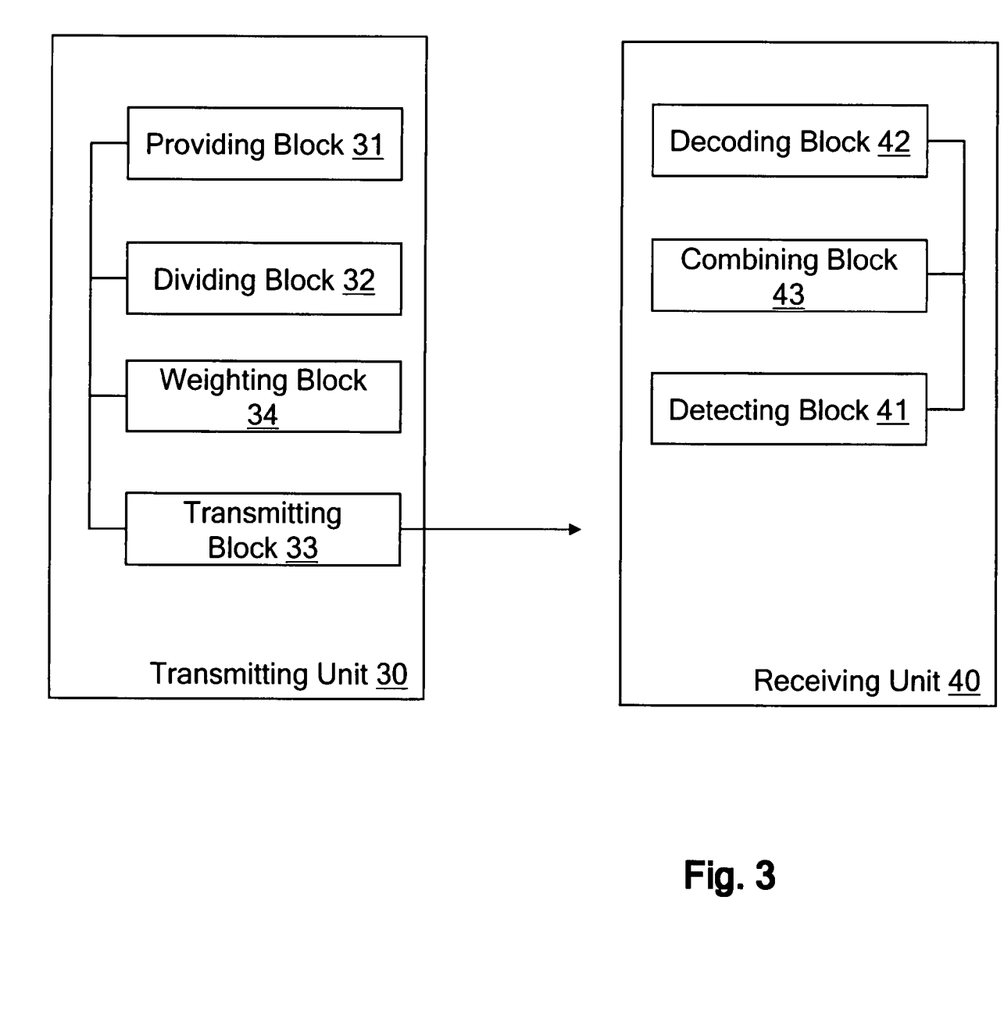
FIG. 3 shows a schematic block diagram illustrating a configuration of a transmitting unit and a receiving unit according to the present invention.
Figure 4:
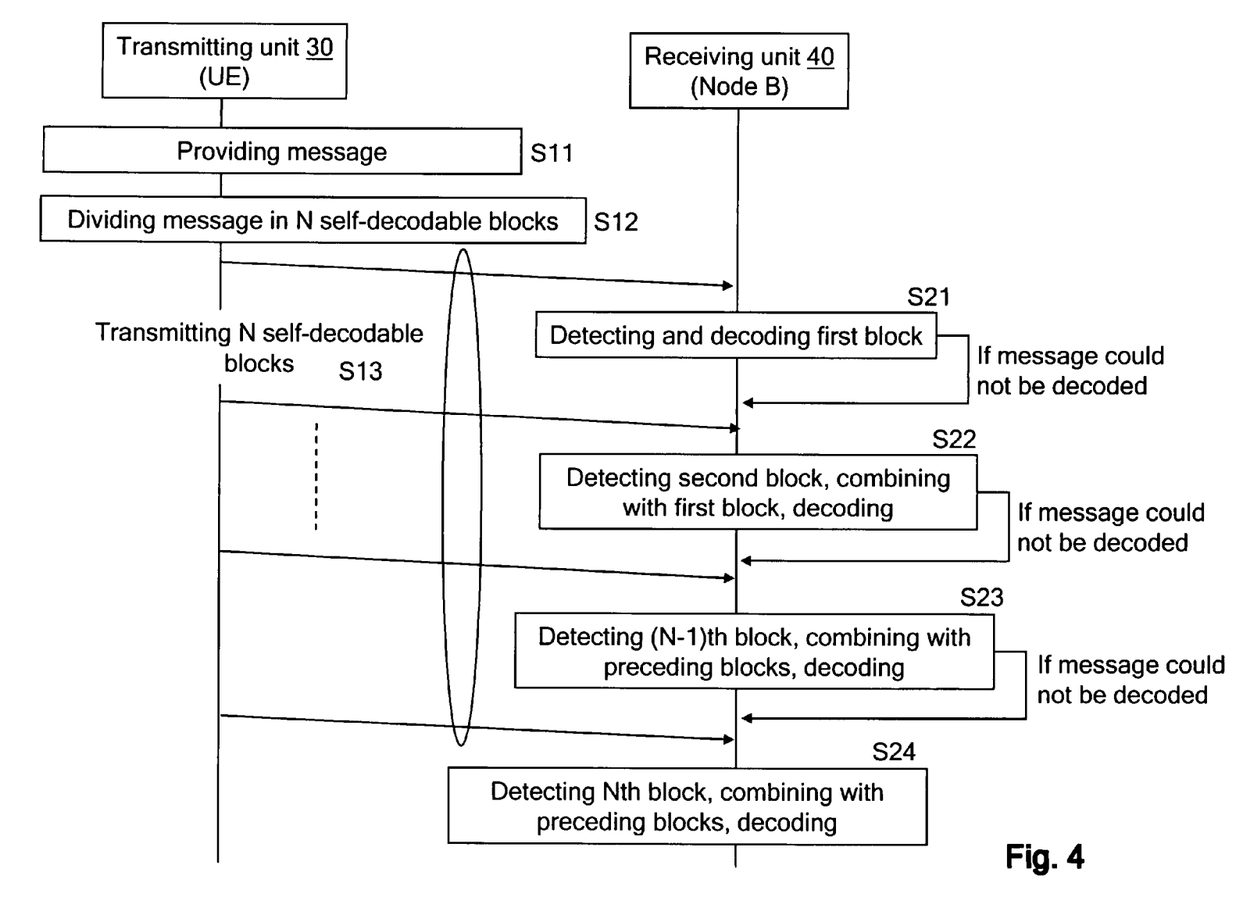
FIG. 4 shows a schematic diagram illustrating operations of the transmitting unit and the receiving unit according to the present invention.

FIG. 3 shows a schematic block diagram illustrating an example configuration of a transmitting unit 30 and a receiving unit 40 according to the present invention. FIG. 4 illustrates operations of the transmitting unit 30 and the receiving unit 40.

The transmitting unit 30 may comprise a user equipment UE which may be any device by means of which a user may access a communications network. The receiving unit 40 may comprise a base station or a Node B according to UMTS, providing communications network access to user equipments. The transmitting and receiving units shown in FIGS. 3 and 4 may comprise further components which, however, are not relevant for understanding the invention and their description is omitted therefore.

The transmitting unit 30 comprises a providing block 31, a dividing block 32 and a transmitting block 33. The transmitting unit 30 may further comprising a weighting block 34. The dividing block 32 may comprise a forming and/or duplicating block and a converting block (not shown).

The receiving unit 40 comprises a detecting block 41 and a decoding block 42. The receiving unit 40 may further comprise a combining block 43. It is to be noted that the configuration shown in FIG. 3 is an example configuration, and the blocks of the respective units can be grouped together or their functions can be further separated to sub-blocks. The functions of the blocks may also be partly or entirely implemented by Digital Signal Processor software and/or Application Specific Integrated Circuits.

The providing block 31 provides a message of a first time period L (step S11). Then, the dividing block 32 divides the message into N self-decodable blocks (step S12), and the transmitting block 33 transmits the N self-decodable blocks towards the communications network (step S13). The N self-decodable blocks may be transmitted in one random access transmission (i.e., during the first time period L).

According to a preferred embodiment of the invention to be described in greater detail later on, the duplicating block of the dividing block 32 duplicates the message N times, thereby obtaining N duplicated messages, and the converting block of the dividing block 32 converts the N duplicated messages to the N self-decodable blocks each having a second time period $l_n=L/N$.

According to another embodiment of the invention, the forming block of the dividing block 32 forms N incremental redundancy versions of the message, and the converting block of the dividing block 32 converts the N incremental redundancy versions of the message to the N self-decodable blocks each having a second time period $l_n$, wherein $$\sum_{n=1}^{N} l_n \leq L.$$

The weighting block 34 may weight a transmission power of each block of the N self-decodable blocks.

On the side of the receiving unit 40, the detecting block 41 detects at least one of N blocks of a message, and the decoding block 42 decodes the at least one of the N blocks for obtaining the message. The at least one of the N blocks may be detected from a random access transmission. In addition, the at least one of the N blocks may be detected within an interval corresponding to a time period of the message.

The combining block 43 may combine at least two of the N blocks before decoding is performed by the decoding block 42. As shown in FIG. 4, in step S21 the first block of the N blocks transmitted from the transmitting unit 30 is detected and decoded in the receiving unit 40. In case the message can be decoded correctly on the basis of the first self-decodable block, the receiving unit 40 can ignore the rest of the blocks transmitted from the transmitting unit 30. Otherwise, the receiving unit 40 gathers the second self-decodable block and combines it with the first self-decodable block after which the receiving unit 40 makes another decoding attempt (step S22). This is repeated (steps S23, S24) until the N self-decodable blocks are combined/decoded or the message can be decoded. Maximal-Ratio Combining may be used to combine different self-decodable blocks.

As mentioned above, the functions of the transmitting unit 30 and the receiving unit 40 may be implemented by Digital Signal Processor software and Application Specific Integrated Circuits.

Figure 5:
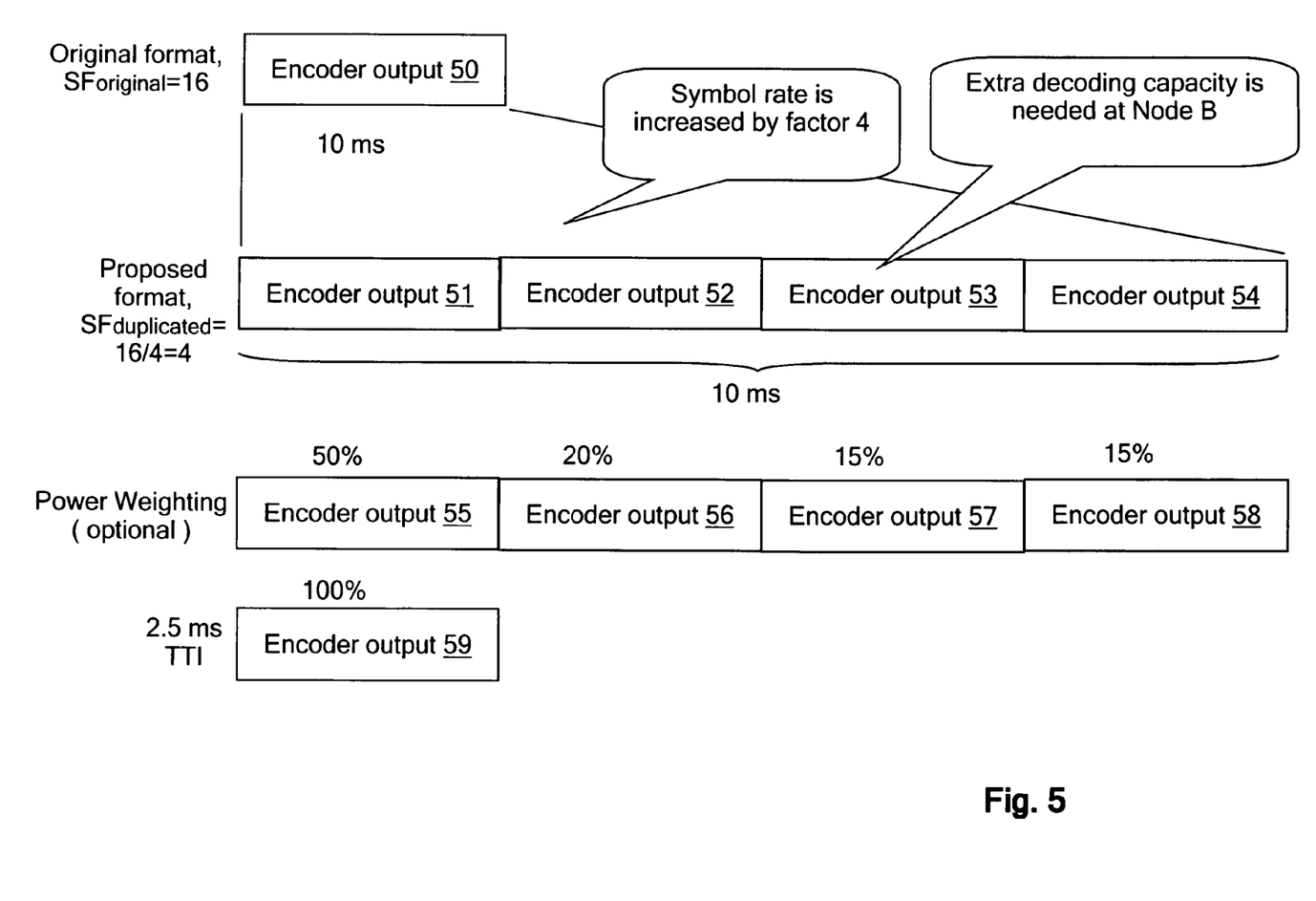
FIG. 5 shows a schematic diagram illustrating a random access transmission transport format according to the present invention.

In the following a preferred embodiment of the invention is described in greater detail. FIG. 5 shows an enhanced transport format for a RACH, which can be used according to 3GPP (third Generation Partnership Project) standard in FDD (Frequency Division Duplex) uplink.

Originally, a message part of a random access transmission (corresponding to an encoder output 50 (original coding block) according to an original format in FIG. 5) has a time period (i.e. Time Transmission Interval, TTI) of 10 ms with a spreading factor (SF) of 16. According to the preferred embodiment, the encoder output 50 of the original format comprising an encoded block of bits is duplicated N=4 times, maintaining the time period of 10 ms also for the N=4 duplicated block of bits. That is, the output of the duplicated signal is transmitted using a transport format having an N times higher channel bit rate than the original format (i.e. $SF_{duplicated}=SF_{original}/N$).

Thus, according to the invention a partially self-decodable message part is provided, i.e. an enhanced message part is divided to self-decodable blocks corresponding to the encoder outputs 51-54 of the proposed format in FIG. 5. As a result, the message part can be decoded already after 2.5 ms even if the transmission interval is 10 ms.

At the side of the receiving unit 40 an attempt to decode the message part (i.e. original coding block) can be done after receiving $N^{th}$ part of the whole TTI, e.g. after receiving the $1^{st}$ self-decodable block. If a CRC (Cyclic Redundancy Check) of the $1^{st}$ self-decoded part is correct, then the receiving unit Node B can ignore the rest of the duplicated blocks. Otherwise the receiving unit gathers the second self-decodable block of the message part combining it with the $1^{st}$ self-decodable block after which it makes another decoding attempt. This is repeated until all the self-decodable blocks are combined/decoded or the message part is detected to be correctly received. Maximal-Ratio Combining can be used to combine different self-decodable blocks of the original coding block.

Power weighting is an optional feature for the proposed transport format and it is applied in such a way that some of the duplicated blocks are transmitted using higher transmission power. In this way the probability of correct decoding after the $1^{st}$ decoding attempt can be increased. FIG. 5 shows an example of power weighting in which the first self-decodable block 55 is transmitted with 50% transmission power, the second block 56 is transmitted with 20% transmission power, and the third and fourth blocks 57, 58 are transmitted with 15% transmission power.

Another optional feature is to use different incremental redundancy versions for different self-decodable blocks. On each retransmission of a block, the set of bits that are actually transmitted may be changed. For example, the set of parity bits chosen for transmission on the second self-decodable block may be different to the set chosen on the first block. These different versions of the coding format for the data block are called "redundancy versions".

FIG. 5 further shows a transport format in which the message part of originally 10 ms is output in an encoder output 59 of 2.5 ms with a transmission power of 100%.

To show the performance differences between different transport formats simulations have been performed using a Rake receiver. Considered transport formats are:

(1) Conventional transport format (10 ms TTI for RACH message part);
(2) 10 ms TTI, 4 self-decodable blocks;
(3) 10 ms TTI, 4 self-decodable blocks: power weighting utilized such that $1^{st}$ self-decodable block takes 50% of the total power, $2^{nd}$ block takes 25%, and the $3^{rd}$ and $4^{th}$ blocks take 12.5%, respectively;
(4) 2.5 ms TTI.

Figure 6:
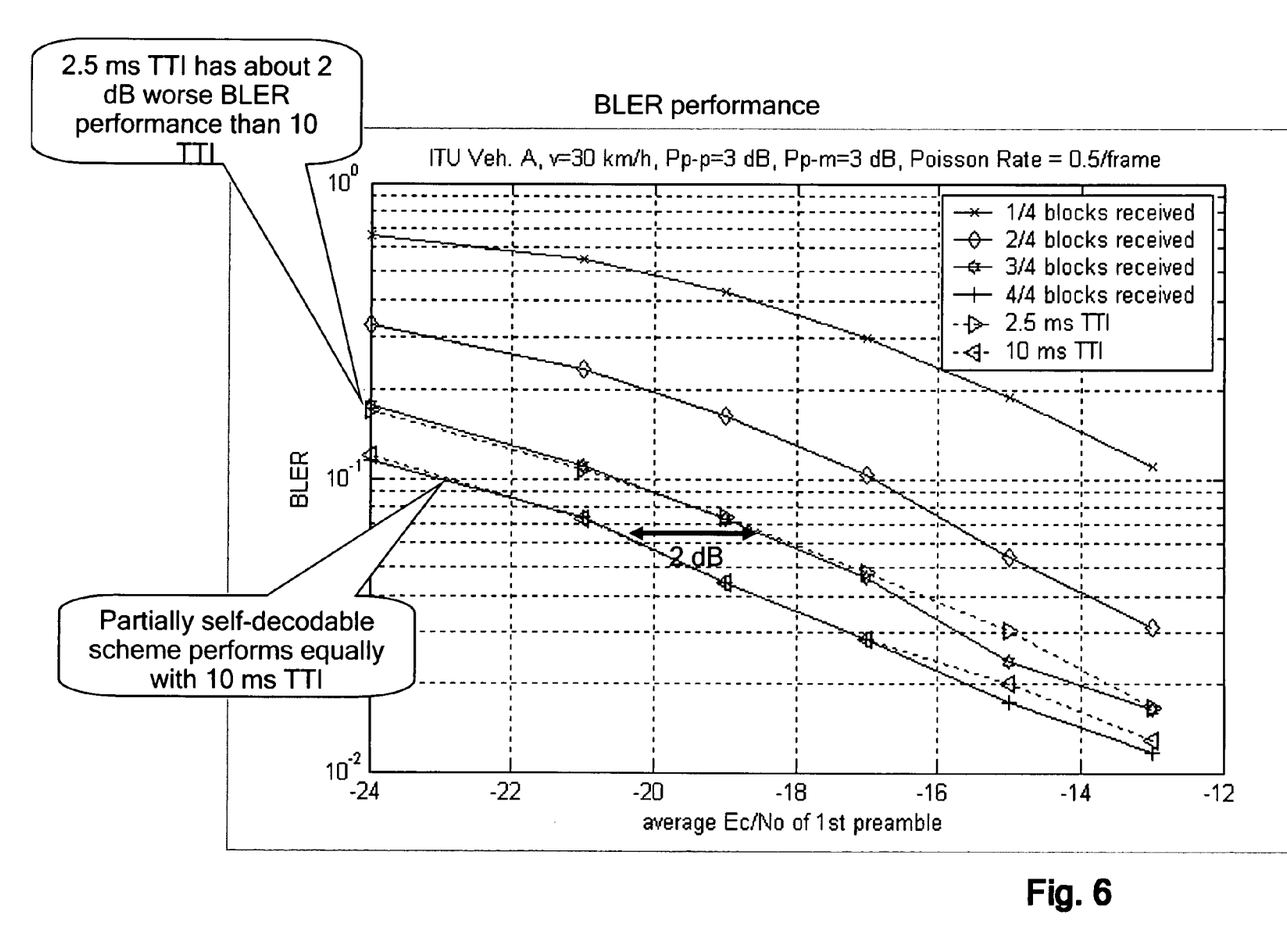
FIG. 6 shows graphs illustrating the BLER performance of the transport format according to the present invention.

FIG. 6 shows graphs illustrating the BLER performance of the transport format (4) according to the present invention in case 1/4, 2/4, 3/4 and 4/4 blocks are received, and the BLER performance of the transport formats (1) and (4).

From FIG. 6 it can be seen that the partially self-decodable scheme of the preferred embodiment performs equally with the conventional transport format (1). Moreover, it can be seen from FIG. 6 that the transport format (4) has an about 2 dB worse BLER performance than the conventional transport format (1). However, it is to be noted that the transport format (4) has a more than 6 dB worse coverage compared with the conventional transport format (1).

Figure 7:
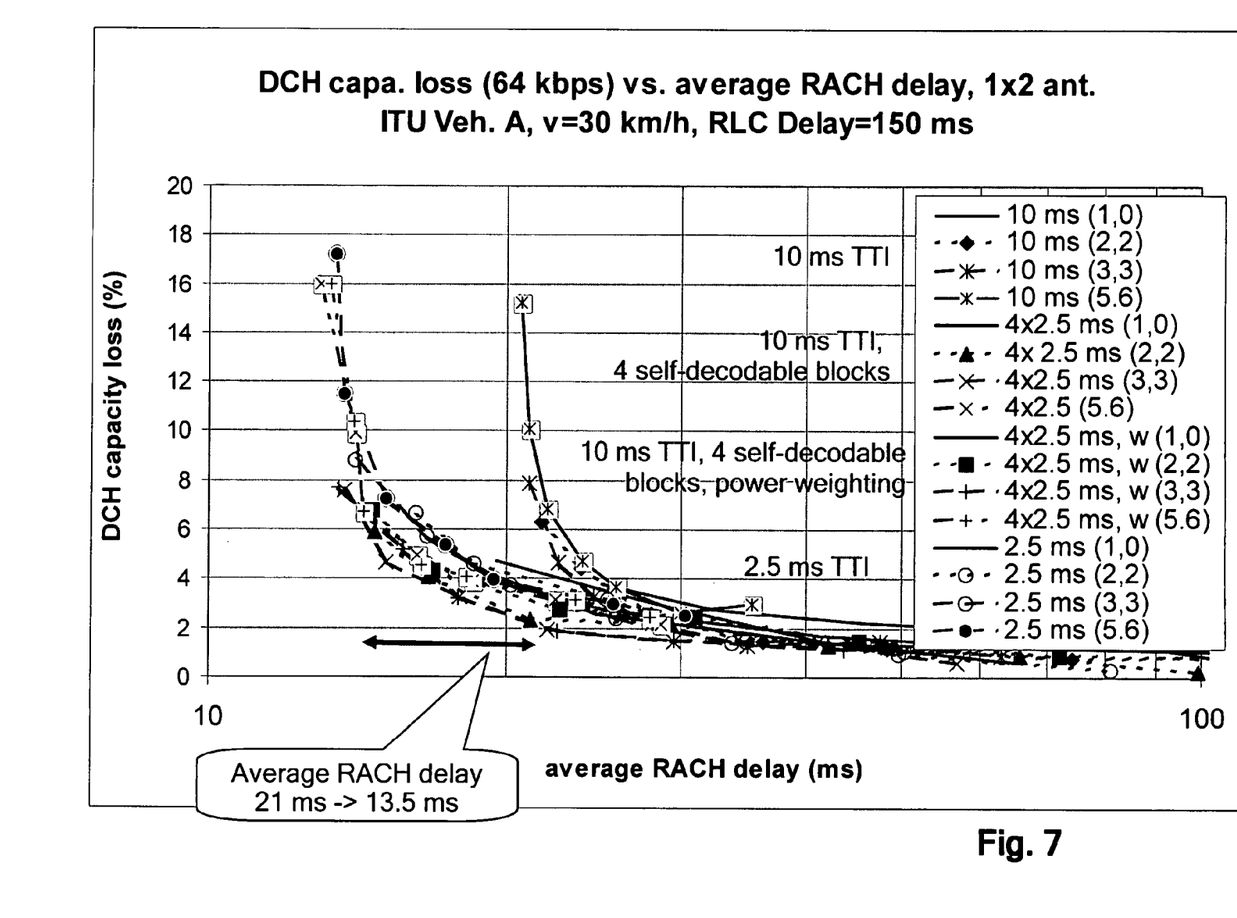
FIG. 7 shows a DCH capacity loss versus an average RACH delay, illustrating the performance of the transport format of the present invention.

FIG. 7 illustrates the function of an average RACH delay and a DCH cell capacity loss in terms of 64 kbps users. The reference case corresponds to the situation where no RACH load is present which gives a cell throughput value of 790 kbps for dedicated channels. The simulation parameters are: ITU Vehicular A channel, v=30 km/h, 2 Rx antennas, average RACH arrival rate=½ frame, Noise rise=3 dB, ratio of other-to-own cell interference=0.5, RLC delay=150 ms, Poisson rate=0.5.

Figure 8:
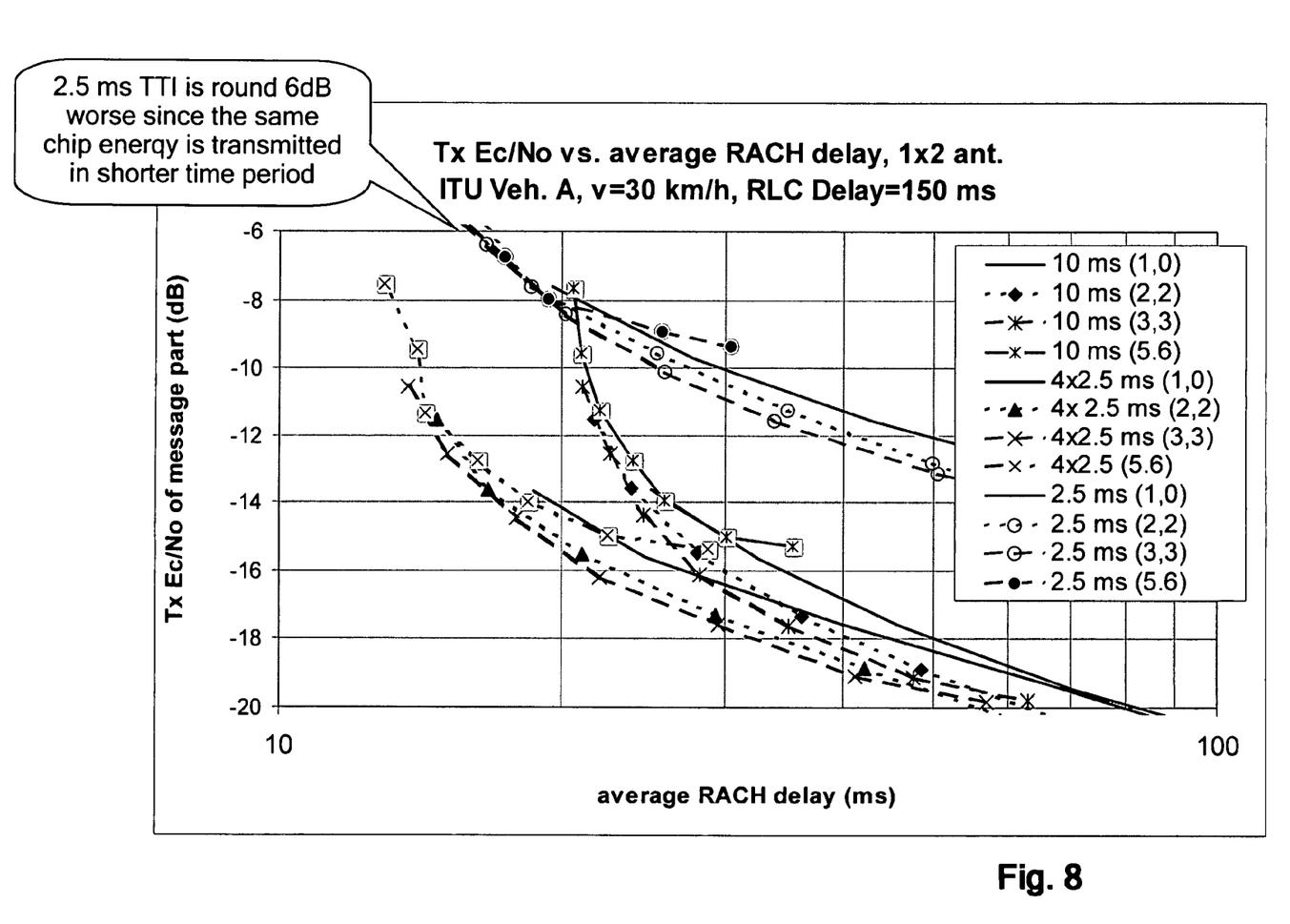
FIG. 8 shows a Tx Ec/No of RACH message part as a function of an average RACH delay, illustrating the performance of the transport format of the present invention.

From FIG. 7 it can be seen that the average RACH delay using the conventional transport format is always more than 20 ms. Using one of the transport formats (2) to (4), the average RACH delay can be decreased to 13 ms. In this example, power weighting does not provide gain against the non-weighted case. From the DCH capacity point of view using the approach of 4 self-decodable blocks is slightly better than the 2.5 ms TTI. However, it should be noted that the 2.5 ms TTI is round 6 dB worse from the RACH coverage point of view since the same chip energy is transmitted in a shorter time period. This can be seen in FIG. 8, which shows the average Tx Ec/No (Transmitter Energy per chip-to-Noise density ratio) of the RACH message part as a function of the average RACH delay using a data rate of the RACH channel of 16 kbps and further using similar simulation parameters as in FIG. 7.

The transport format according to the invention shortens the RACH processing time since the decoding can be based on the first self-decodable block or burst. In other words, by allowing faster decoding attempts RACH delays are reduced. At the same time the invention maintains good performance properties in terms of uplink capacity and coverage.

In particular the present invention can be applied to communications systems using a random access channel type access technique, and is especially suitable for WCDMA (Wideband Code Division Multiple Access).

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
a processor; and
a memory including computer program code,
the memory and the computer program code configured to, with the processor, cause the apparatus at least to
provide a message of a first time period L;
divide the message into N self-decodable blocks, and
transmit the N self-decodable blocks towards a communications network, wherein the transmitter is further configured to form N incremental redundancy versions of the message, where the number of self-decodable blocks equals the number of incremental redundancy versions, and convert the N incremental redundancy versions of the message to the N self-decodable blocks each having a second time period $l_n$, and wherein $$\sum_{n=1}^{N} l_n \leq L.$$

2. An apparatus according to claim 1, wherein the apparatus is further configured to weigh a transmission power of at least one self-decodable block of the N self-decodable blocks.

3. An apparatus according to claim 1, wherein the apparatus is further configured to transmit the N self-decodable blocks in a random access transmission.

4. An apparatus according to claim 1, wherein the apparatus comprises a mobile terminal.

5. An apparatus, comprising:
a processor; and
a memory including computer program code,
the memory and the computer program code configured to, with the processor, cause the apparatus at least to
provide a message of a first time period L,
divide the message into N self-decodable blocks, and
transmit the N self-decodable blocks towards a communications network, wherein the transmitter is further configured to duplicate the message N times to obtain N duplicated messages, where the number of self-decodable blocks equals the number of duplicated messages, and to convert the N duplicated messages to the N self-decodable blocks each having a second time period $l_n$=L/N.

6. An apparatus according to claim 5, wherein the apparatus is further configured to weigh a transmission power of at least one self-decodable block of the N self-decodable blocks.

7. An apparatus according to claim 5, wherein the apparatus is further configured to transmit the N self-decodable blocks in a random access transmission.

8. An apparatus according to claim 5, wherein the apparatus comprises a mobile terminal.

9. An apparatus, comprising:
a processor; and
a memory including computer program code,
the memory and the computer program code configured to, with the processor, cause the apparatus at least to
detect at least one block of N blocks of a message, said at least one block being less than N blocks,
decode the at least one block of the N blocks to obtain the message, and
combine at least two blocks of the N blocks before said decoding.

10. An apparatus according to claim 9, wherein the apparatus is further configured to detect the at least one block of the N blocks within an interval corresponding to a time period of the message.

11. An apparatus according to claim 9, wherein the apparatus is further configured to detect the at least one block of the N blocks from a random access transmission.

12. An apparatus according to claim 9, wherein the apparatus comprises a base station of a communications network.

13. A method, comprising:
providing a message of a first time period L at a transmitter;
dividing the message into N self-decodable blocks; and
transmitting the N self-decodable blocks via the transmitter towards a communications network wherein the dividing comprises forming N incremental redundancy versions of the message, where the number of self-decodable blocks equals the number of incremental redundancy versions, and converting the N incremental redundancy versions of the message to the N self-decodable blocks each having a second time period $l_n$, and wherein $$\sum_{n=1}^{N} l_n \leq L.$$

14. A method according to claim 13, further comprising:
weighting a transmission power of at least one self-decodable block of the N self-decodable blocks.

15. A method according to claim 13, wherein, in the transmitting, the N self-decodable blocks are transmitted in a random access transmission.

16. A method, comprising:
providing a message of a first time period L at a transmitter;
dividing the message into N self-decodable blocks; and
transmitting the N self-decodable blocks via the transmitter towards a communications network, wherein the dividing comprises duplicating the message N times to obtain N duplicated messages, where the number of self-decodable blocks equals the number of duplicated messages, and converting the N duplicated messages to the N self-decodable blocks each having a second time period $l_n$=L/N.

17. A method according to claim 16, further comprising:
weighting a transmission power of at least one self-decodable block of the N self-decodable blocks.

18. A method according to claim 16, wherein, in the transmitting, the N self-decodable blocks are transmitted in a random access transmission.

19. A method, comprising:
detecting at least one block of N blocks of a message at a receiver, said at least one block being less than N blocks;
decoding the at least one block of the N blocks to obtain the message via the receiver; and
combining at least two blocks of the N blocks before decoding is performed.

20. A method according to claim 19, wherein, in the detecting, the at least one block of the N blocks is detected within an interval corresponding to a time period of the message.

21. A method according to claim 19, wherein, in the detecting, the at least one block of the N blocks is detected from a random access transmission.

22. A computer program embodied on a computer-readable medium, the computer program configured to control a processor to perform a process, the process comprising:
providing a message of a first time period L at a transmitter;
dividing the message into N self-decodable blocks; and
transmitting the N self-decodable blocks via a transmitter towards a communications network wherein the dividing comprises forming N incremental redundancy versions of the message, where the number of self-decodable blocks equals the number of incremental redundancy versions, and converting the N incremental redundancy versions of the message to the N self-decodable blocks each having a second time period $l_n$, and wherein $$\sum_{n=1}^{N} l_n \leq L.$$

23. The computer program according to claim 22, wherein the computer program is directly loadable into an internal memory of a computer.

24. A computer program according to claim 22, the process further comprising:
weighting a transmission power of at least one self-decodable block of the N self-decodable blocks.

25. A computer program according to claim 22, wherein, in the transmitting, the N self-decodable blocks are transmitted in a random access transmission.

26. A computer program embodied on a computer-readable medium, the computer program configured to control a processor to perform a process, the process comprising:

detecting at least one block of N blocks of a message at a receiver, said at least one block being less than N blocks;

decoding the at least one block of the N blocks for obtaining the message via the receiver; and combining at least two blocks of the N blocks before decoding is performed.

27. A computer program according to claim 26, wherein, in the detecting, the at least one block of the N blocks is detected within an interval corresponding to a time period of the message.

28. A computer program according to claim 26, wherein, in the detecting, the at least one block of the N blocks is detected from a random access transmission.

29. An apparatus, comprising:

providing means for providing a message of a first time period L;

dividing means for dividing the message into N self-decodable blocks; and transmitting means for transmitting the N self-decodable blocks towards a communications network, wherein the dividing means comprises forming means for forming N incremental redundancy versions of the message, where the number of self-decodable blocks equals the number of incremental redundancy versions, and converting means for converting the N incremental redundancy versions of the message to the N self-decodable blocks each having a second time period $l_n$, and wherein $$\sum_{n=1}^{N} l_n \le L.$$

30. An apparatus, comprising:

providing means for providing a message of a first time period L;

dividing means for dividing the message into N self-decodable blocks; and transmitting means for transmitting the N self-decodable blocks towards a communications network, wherein the dividing means comprises duplicating means for duplicating the message N times to obtain N duplicated messages, where the number of self-decodable blocks equals the number of incremental redundancy versions, and converting means for converting the N duplicated messages to the N self-decodable blocks each having a second time period $l_n = L/N$.

31. An apparatus, comprising:

detecting means for detecting at least one block of N blocks of a message, said at least one block being less than N blocks;

decoding means for decoding the at least one block of the N blocks to obtain the message; and combining means for combining at least two blocks of the N blocks before said decoding.

32. A computer program embodied on a computer-readable medium, the computer program configured to control a processor to perform a process, the process comprising:

providing a message of a first time period L at a transmitter;

dividing the message into N self-decodable blocks; and transmitting the N self-decodable blocks via the transmitter towards a communications network, wherein the dividing comprises duplicating the message N times to obtain N duplicated messages, where the number of self-decodable blocks equals the number of duplicated messages, and converting the N duplicated messages to the N self-decodable blocks each having a second time period $l_n = L/N$.

33. A computer program according to claim 32, the process further comprising:

weighting a transmission power of at least one self-decodable block of the N self-decodable blocks.

34. A computer program according to claim 32, wherein, in the transmitting, the N self-decodable blocks are transmitted in a random access transmission.

* * * * *

UNITED STATES PATENT AND TRADEMARK OFFICE
CERTIFICATE OF CORRECTION

PATENT NO. : 7,827,475 B2
APPLICATION NO. : 11/229582
DATED : November 2, 2010
INVENTOR(S) : Esa Tiirola et al.

It is certified that error appears in the above-identified patent and that said Letters Patent is hereby corrected as shown below:

Column 2:

Line 25, change "claim 1" to -- claims 1, 5, 29 or 30 --

Line 26, change "claim 13" to -- claims 13 or 16 --

Line 27, change "claim 7" to -- claims 9 or 31 --

Line 28, change "claim 18" to -- claim 19 --

Signed and Sealed this
Eighteenth Day of December, 2012

David J. Kappos
*Director of the United States Patent and Trademark Office*